(12) United States Patent
Kanna et al.

(10) Patent No.: US 8,937,946 B1
(45) Date of Patent: Jan. 20, 2015

(54) SYSTEM AND METHOD FOR IDENTIFYING TUNNEL INFORMATION WITHOUT FREQUENTLY POLLING ALL ROUTERS FOR ALL TUNNEL INFORMATION

(71) Applicant: Packet Design, LLC, Santa Clara, CA (US)

(72) Inventors: Satish Kanna, San Jose, CA (US); Siddharth Taneja, Sunnyvale, CA (US); Cengiz Alaettinoglu, Sherman Oaks, CA (US)

(73) Assignee: Packet Design, Inc., Santa Clara, CA (US)

( * ) Notice: Subject to any disclaimer, the term of this patent is extended or adjusted under 35 U.S.C. 154(b) by 84 days.

(21) Appl. No.: 13/659,814

(22) Filed: Oct. 24, 2012

Related U.S. Application Data

(60) Provisional application No. 61/628,168, filed on Oct. 24, 2011.

(51) Int. Cl.
*H04L 12/26* (2006.01)

(52) U.S. Cl.
USPC ............ 370/389; 370/401; 370/248; 370/254

(58) Field of Classification Search
CPC ...................................................... H04L 1/1685

USPC .................................. 370/338, 254, 235, 248
See application file for complete search history.

(56) References Cited

U.S. PATENT DOCUMENTS

| | | | |
|---|---|---|---|
| 7,334,045 B1 * | 2/2008 | Jacobson et al. | 709/238 |
| 7,768,946 B2 * | 8/2010 | Salonen | 370/255 |
| 8,023,517 B2 * | 9/2011 | Yang et al. | 370/401 |
| 8,218,553 B2 * | 7/2012 | Kompella | 370/395.5 |
| 8,630,189 B2 * | 1/2014 | Wang et al. | 370/248 |
| 2002/0061001 A1 * | 5/2002 | Garcia-Luna-Aceves et al. | 370/338 |
| 2006/0215577 A1 * | 9/2006 | Guichard et al. | 370/254 |
| 2006/0291391 A1 * | 12/2006 | Vasseur et al. | 370/235 |
| 2008/0151917 A1 * | 6/2008 | Bartlett et al. | 370/401 |
| 2009/0003217 A1 * | 1/2009 | Ferra et al. | 370/238 |
| 2010/0195540 A1 * | 8/2010 | Kerr et al. | 370/259 |
| 2011/0072129 A1 * | 3/2011 | Le Pennec et al. | 709/224 |
| 2011/0107098 A1 * | 5/2011 | Hong et al. | 713/168 |
| 2011/0296005 A1 * | 12/2011 | Labovitz et al. | 709/224 |

* cited by examiner

*Primary Examiner* — Khaled Kassim
*Assistant Examiner* — Parth Patel
(74) *Attorney, Agent, or Firm* — Hulsey Calhoun, P.C.

(57) ABSTRACT

A system and method uses messages and traps to identify routers to selectively request information about tunnels on a network in order to maintain tunnel information about a network to minimize the impact of maintaining such information.

12 Claims, 6 Drawing Sheets

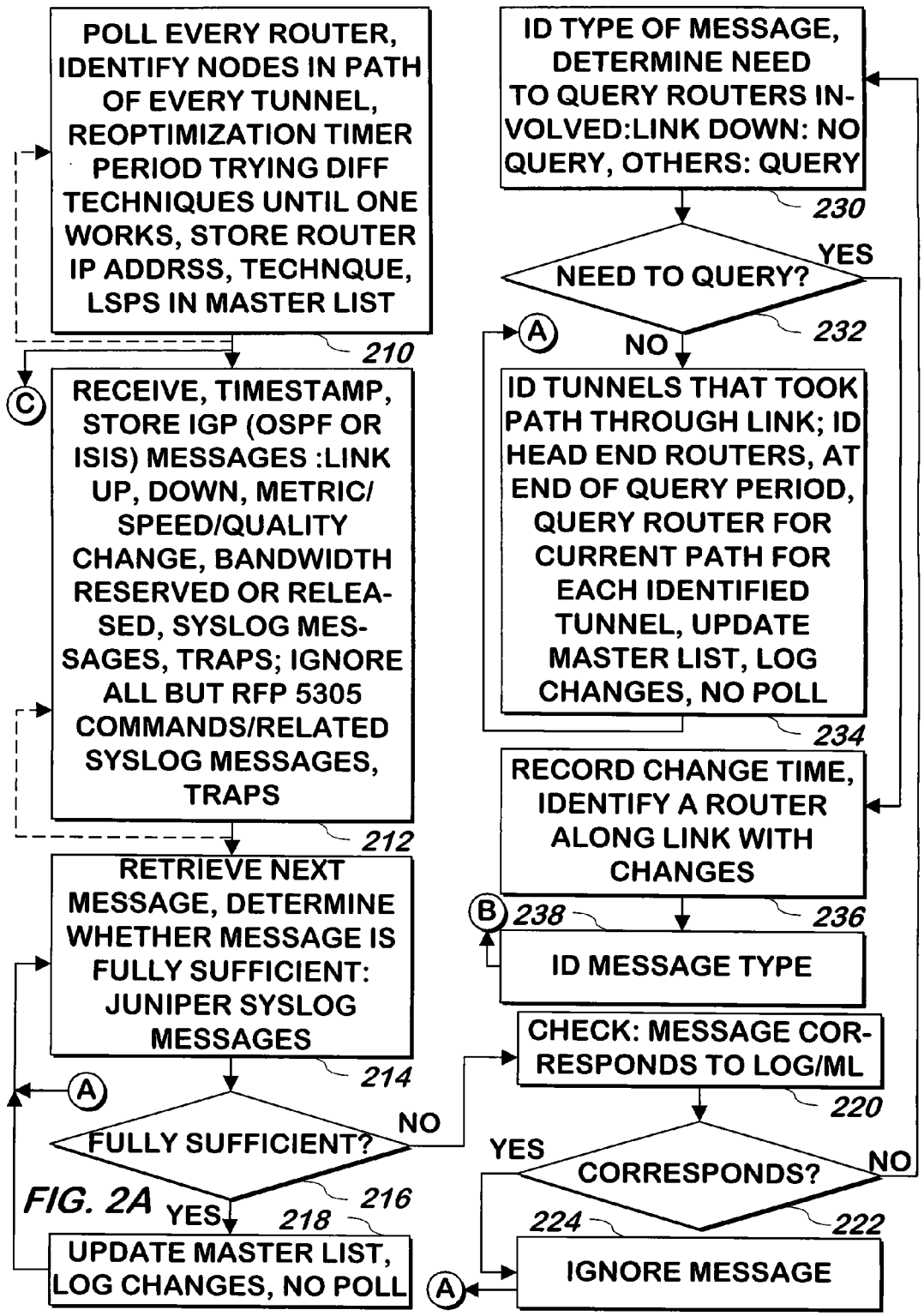

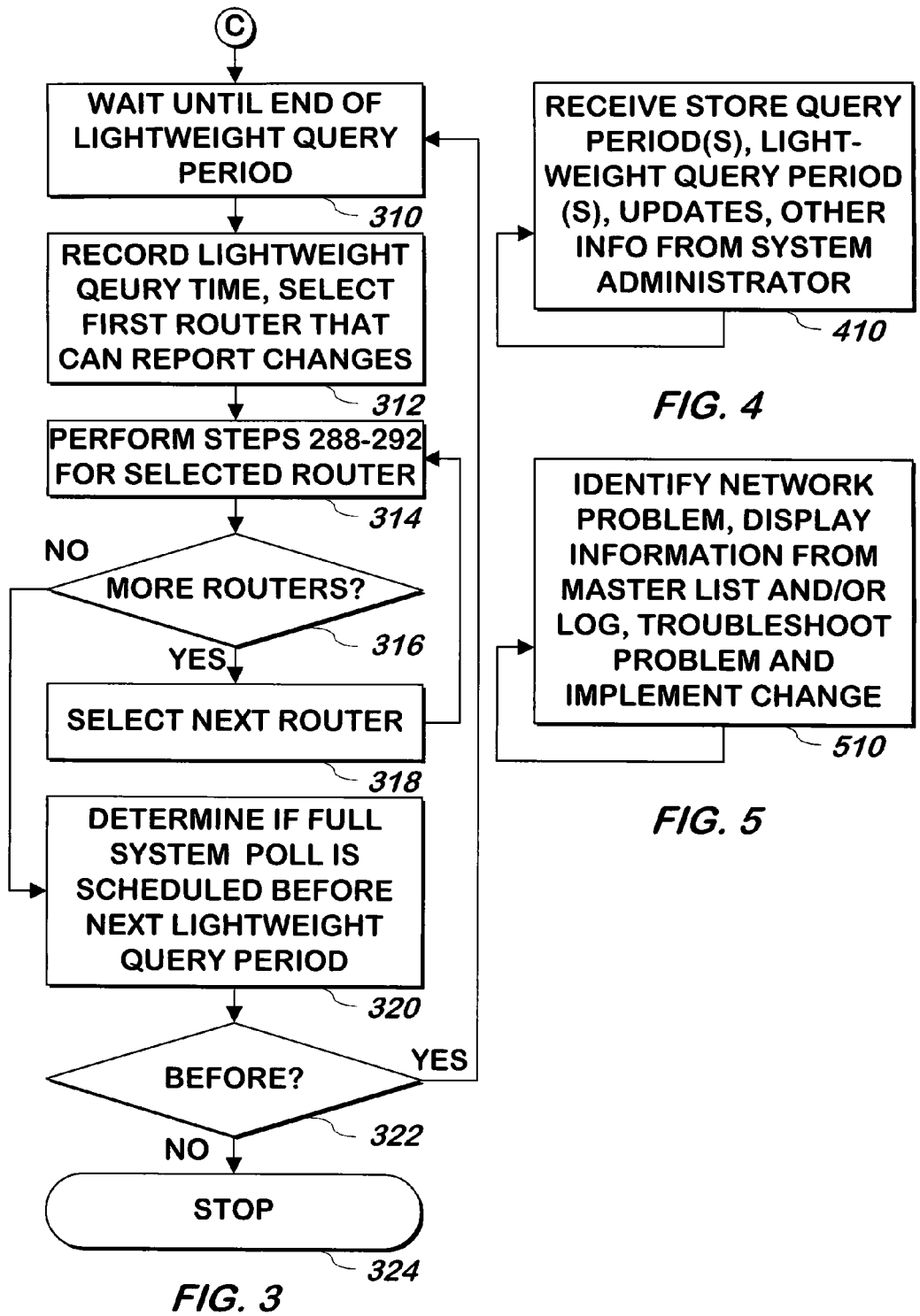

SYSTEM AND METHOD FOR IDENTIFYING TUNNEL INFORMATION WITHOUT FREQUENTLY POLLING ALL ROUTERS FOR ALL TUNNEL INFORMATION

RELATED APPLICATION

This application claims the benefit of U.S. Provisional Application Ser. No. 61/628,168, entitled, "Method and Apparatus for Identifying Tunnel Information Without Frequently Polling All Routers for All Tunnel Information" filed by Satish Kanna, Siddharth Taneja and Cengiz Alaettinoglu on Oct. 24, 2011, and having the same assignee as the present application, and is hereby incorporated by reference in its entirety.

FIELD OF THE INVENTION

The present invention is related to computer network software and more specifically to computer network software for identifying tunnel information.

BACKGROUND OF THE INVENTION

To identify tunnel information, such as path information, in a computer network such as an autonomous system, conventional tunnel management systems poll every router in the network for a complete set of tunnel information. The complete set of tunnel information from each router may be aggregated to form a complete set of tunnel information for a network.

Routers may change tunnel information such as tunnel paths frequently throughout the day. In order to troubleshoot tunnel problems, it can be helpful if the troubleshooter has a currently accurate set of tunnel information.

However, there are several problems with conventional tunnel information reporting systems. Responding to a request for a complete set of tunnel information can cause the processor on the router to slow down, reducing routing performance, and the response to the request can be lengthy, impacting the bandwidth of the network. As a result, the operators of network information reporting solutions that request and aggregate tunnel information received in response to such requests are forced to choose between frequent requests for information from all of the routers so that the tunnel information is up to date, and infrequent requests for information from all of the routers so that the router and network performance are not impacted as much.

SUMMARY OF INVENTION

A system and method requests a complete set of tunnel information from all routers infrequently, and adds the information received and an identifier of the router from which it was received to a master list of tunnel information for the network.

The system and method then watches messages sent by routers and other devices on the network that could potentially indicate tunnel information may be impacted. For each such message, a router is identified for which tunnel information may have changed, and the router is requested to indicate whether any tunnel information has changed since the last time the router was queried either in a similar fashion or via a request for a complete set of tunnel information. If the router provides a negative answer, no further information is requested in response to that message. If the router responds affirmatively, the router is requested only to identify the one or more tunnels that were affected, and then the master list is consulted to identify the head end router for the affected tunnel or tunnels and the head end router or routers for each tunnel is requested to provide information such as path information. The request is incorporated into the master list and logged. This set of one or more queries may be referred to as a lightweight set of queries.

The lightweight set of queries may be made by the system and method to each router in the network, more frequently than the request for all router information to ensure that router information that changes, and for which a message may not be generated, is received.

Certain messages are checked to see if they are for tunnel issues already known, or if they supply a complete set of information about any tunnel change, and if so, no query to any router may be made for such messages.

Messages that may impact tunnel path optimizations may cause several lightweight queries to be made to a router approximately during one path optimization period of that router. The period may be received with the complete set of tunnel information.

BRIEF DESCRIPTION OF THE DRAWINGS

FIG. 3 is a flowchart illustrating a method of updating the information obtained in the performance of the method of FIG. 2 via a lighweight system poll according to one embodiment of the present invention.

FIG. 4 is a flowchart illustrating a method of receiving system administrator supplied parameters from a system administrator according to one embodiment of the present invention.

FIG. 5 is a flowchart illustrating a method of troubleshooting and configuring a network using the master list and/or log according to one embodiment of the present invention.

DETAILED DESCRIPTION OF A PREFERRED EMBODIMENT

Figure 1:
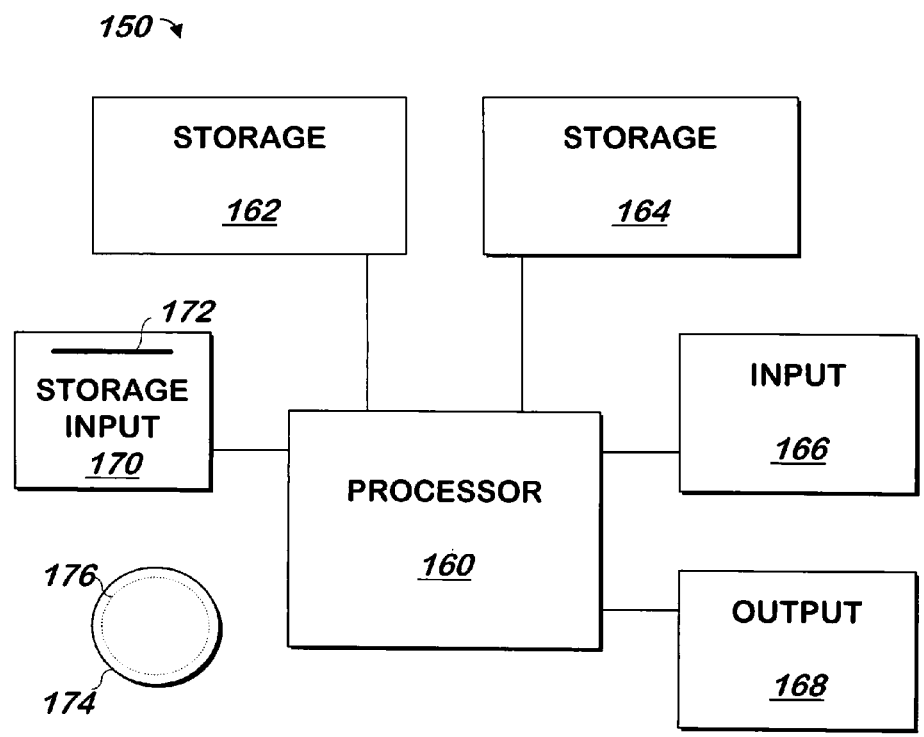
FIG. 1 is a block schematic diagram of a conventional computer system.

The present invention may be implemented as computer software on a conventional computer system. Referring now to FIG. 1, a conventional computer system 150 for practicing the present invention is shown. Processor 160 retrieves and executes software instructions stored in storage 162 such as memory, which may be Random Access Memory (RAM) and may control other components to perform the present invention. Storage 162 may be used to store program instructions or data or both. Storage 164, such as a computer disk drive or other nonvolatile storage, may provide storage of data or program instructions. In one embodiment, storage 164 provides longer term storage of instructions and data, with storage 162 providing storage for data or instructions that may only be required for a shorter time than that of storage 164. Input device 166 such as a computer keyboard or mouse or both allows user input to the system 150. Output 168, such as a display or printer, allows the system to provide information such as instructions, data or other information to the user of the system 150. Storage input device 170 such as a conventional floppy disk drive or CD-ROM drive accepts via input 172 computer program products 174 such as a conventional floppy disk or CD-ROM or other nonvolatile storage media that may be used to transport computer instructions or data to the system 150. Computer program product 174 has encoded thereon computer readable program code devices 176, such as magnetic charges in the case of a floppy disk or optical encodings in the case of a CD-ROM which are encoded as program instructions, data or both to configure the computer system 150 to operate as described below.

In one embodiment, each computer system 150 is a conventional SUN MICROSYSTEMS SPARC ENTERPRISE M9000 SERVER running the SOLARIS operating system commercially available from ORACLE CORPORATION of Redwood Shores, Calif., a PENTIUM-compatible personal computer system such as are available from DELL COMPUTER CORPORATION of Round Rock, Tex. running a version of the WINDOWS operating system (such as 95, 98, Me, XP, NT or 2000) commercially available from MICROSOFT Corporation of Redmond Wash. or a Macintosh computer system running the MACOS or OPENSTEP operating system commercially available from APPLE INCORPORATED of Cupertino, Calif. and the FIREFOX browser commercially available from MOZILLA FOUNDATION of Mountain View, Calif. or INTERNET EXPLORER browser commercially available from MICROSOFT above, although other systems may be used. Each computer system 150 may be a DROID 2 mobile telephone commercially available from MOTOROLA CORPORATION of Schaumberg, Ill. running the ANDROID operating system commercially available from GOOGLE, INC. of Mountain View, Calif. Various computer systems may be employed, with the various computer systems communicating with one another via the Internet, a conventional cellular telephone network, an Ethernet network, or all of these.

Figure 2B:
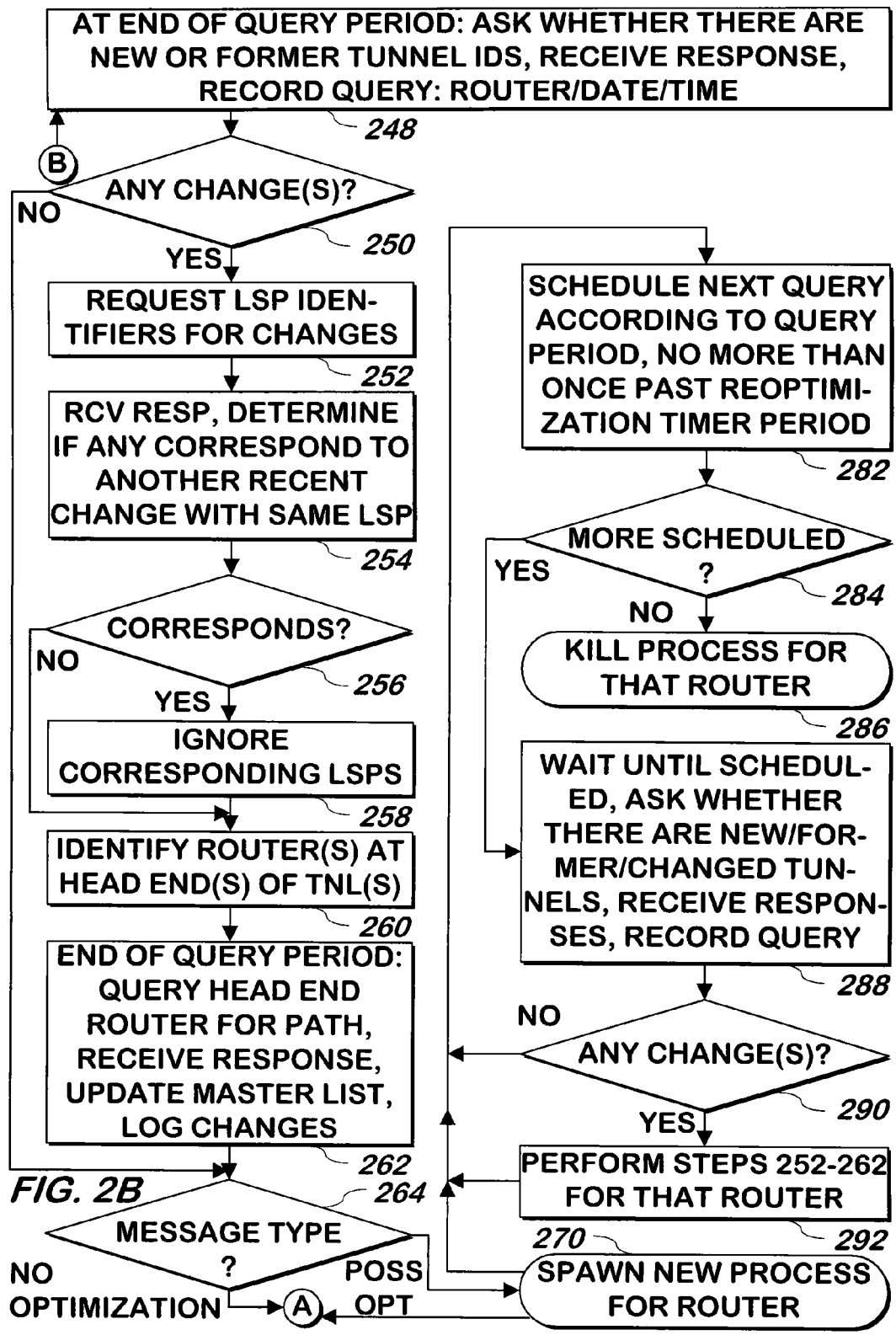
FIG. 2, consisting of FIGS. 2A and 2B is a flowchart illustrating a method of obtaining and maintaining a master list of information about tunnels in a network according to one embodiment of the present invention.

FIG. 2, consisting of FIGS. 2A and 2B, is a flowchart illustrating a method of obtaining and maintaining a master list of information about tunnels in a network according to one embodiment of the present invention.

Referring now to FIG. 2, infrequently relative to the potential frequency of changes, such as once per day, a system and method performs a full system poll 210 of tunnel information from all of the routers that can potentially provide it, using a master list of router IP addresses. The full system poll obtains from each router that could be a head end router for a tunnel or could carry tunnel traffic, for each tunnel (identified by an LSP) for which the router is a head end router, the nodes in the path of that tunnel at the time of the poll, as well as the tunnel path reoptimization timer period of that router if that router may reoptimize some or all of a tunnel path. The LSP and nodes in the path for that LSP are added to a master list of LSPs for each router, which is maintained as described below, and the other information, including the IP address of the router and date, is stored in the master list. In one embodiment, the bandwidth allocated to each tunnel is also received for each tunnel in addition to the path, and such information is stored in the master list.

To request information from a router, the system and method may try several techniques until one of them works properly, and then records in the master list the technique that worked for each router. The next time information is requested from that router, the system and method consults the master list, and starts with the technique that is recorded for the router. The techniques may include SNMP, CLI via telnet or SSH, Junos Netconf or Junos Script.

The system and method acts as a router to receive and store 212 on an ongoing basis (indicated by the dashed line in the figure) IGP messages, including ISIS messages and OSPF messages, and filters out those that are not RFC5305 or 3630 comments-type messages. The system and method additionally receives or retrieves from a network management server to which they have been provided, syslog messages or SNMP trap messages or other traps (collectively referred to as "Traps") and filters out messages not related to RFC5305 or 3630 comments-type messages.

A message not filtered as described above is selected and the selected message is investigated to determine if the message is fully sufficient to obtain all pertinent path change information for one or more LSPs to which it corresponds 214. For example, syslog messages received from Juniper routers may be fully sufficient. If the message is fully sufficient 216, the master list is updated using the information from that message, the changes made to the master list are added as an entry to a log, timestamped and associated with the message that cause the change corresponding to the log entry to be made 218, and the next IGP message, syslog message or trap is selected for processing as described herein. No polling of any router is performed in response to a fully sufficient message.

If the message is not fully sufficient 216, the message is investigated to determine whether that message corresponds to a recent entry in the log or the master list 220. A message may correspond to the log or master list for any of several reasons. One reason is that a single network change generated two messages, such as an IGP message and a SNMP trap. Another reason is that a change already logged can fully explain the subsequent message. For example, a bandwidth reservation change message can indicate that the bandwidth reserved over a link has changed. If the changed bandwidth reserved on a link matches the total bandwidth for all of the tunnels indicated on the master list as traversing the link, the message can be fully explained by the master list. If the message is such a message 222, no querying of any router is considered to be required to update the master list. Such messages will be ignored (i.e. will not cause the polling of any routers) 224 and the method continues at step 214.

If the message is not determined to correspond to an entry in the log or to the master list 224, the type of message is investigated to determine whether the router or routers corresponding to the message or trap received should be queried 230. In one embodiment, a link down message or trap is a type of message or trap that indicates that the routers at each end of the link described in the message should not be queried. Other messages indicate a query should be performed on of the router or one of the routers to which the message or trap corresponds.

If the type of message indicates that no query of the router or routers corresponding to the message or trap should be performed 232, the tunnels that traversed the link corresponding to the message are identified from the master list, and the head end routers of such tunnels are identified, also from the master list 234. The head end router for each tunnel is queried to determine the path of any such tunnel and such information is used to update the master list and log the change (all logs are timestamped), although none of the routers corresponding to the message or trap is queried 234.

In one embodiment, a head end router may provide a standby path in addition to a path when the path of a tunnel is retrieved as described herein. The standby path may be added to the master list, along with the date and time it was added. If a tunnel having a path in which a link has gone down has a standby path in the master list, and the links in the path have not gone down since the standby path was identified, or, in one embodiment, have not been affected so that the standby path may have been changed, each as indicated by messages related to the links in the standby path since the standby path was received, the standby path may be assumed to have been taken by the tunnel and no query of the head end router is performed when a link goes down in the path of a tunnel.

In one embodiment, each time a router is queried, the date and time of the query is stored associated with an identifier (e.g. the IP address) of the router queried. A subsequent query will not be made to that router until the end of the query period, which may be configurable by a system administrator as described below. A set of queries related, such as asking for whether there were any changes, and then asking what tunnels changed, may be treated as a single query for purposes of identifying whether the query period for a router has expired (i.e. the query to determine which LSPs have changed may be made less than the query period amount of time after the query to determine whether there were any changes), though the date and time of the last query in the set may be the one that is used to calculate whether the query period has expired when preparing the next query.

If there is a need to query the router corresponding to the message 232, the time of change is recorded and a router corresponding to the message is identified 236. In one embodiment, if the message pertains to a link, the router identified is the router corresponding to the source end of a link. If the message pertains to a router, the router may be identified or a different router linked to that router may be identified.

A second type of the message or trap is identified 238. This type of the message identifies whether the message or trap is one that could affect the optimization of the tunnel path. A link bandwidth reservation change message is one example of such a message.

At the end of the query period for the identified router, or immediately if the query period for such router has already ended, the router is queried to determine whether there have been any changes to the tunnels traversing the identified link. The router responds either affirmatively or negatively and such response is received. The IP address of the router and the date and time of the query is recorded 248.

If the response indicates that there have been no changes 250, if the message type identified is not one that could affect the optimization of the tunnel path 264, the next IGP message, syslog message or trap received is processed as described above 214. If the message type is one that could affect the optimization of the tunnel path 264, the method continues at step 270, where a new process is started for that router as described in more detail below.

If the response indicates that there has been changes to at least one tunnel traversing the link 250, a request is made to the router to identify such changed tunnels traversing the link 252, the router responds with the LSP of each such tunnels, and such response is received 254. In one embodiment, a router may identify itself as the head end router for a new tunnel as part of this response. In one embodiment, as noted above, the query period is not used for this query, though in another embodiment, this query would wait until the end of the query period.

As part of step 254, the log is checked to determine whether recent changes for the same LSP have been logged that would explain any change corresponding to the response 254, and such LSPs in the response are ignored 256-258. If there are no remaining (i.e. un-ignored) LSPs, the method continues at step 214. For the remaining LSPs, if any 256, the head end router, if known is identified from the master list 260, and each such head end router is queried at the end of its query period to identify the path of the remaining LPSs for which that router is the head end router 262. The responses from each such head end router are used to update the master list and to update the log to indicate the changes made to each LSP and part of step 262.

If there are no remaining LSPs, or after all remaining LSPs have been used to update the master list and log as described above, if the message type identified is not one that could affect the optimization of the tunnel path 264, the next IGP message, syslog message or trap received is selected and processed as described above 214. If the message type is one that could affect the optimization of the tunnel path 264, a new process is started for that router 1226 1226 270.

In one embodiment, some messages or traps may be processed in parallel or substantially in parallel (meaning the steps of processing the message or trap are performed before the steps of processing a different message or trap has completed. In one embodiment, messages or traps pertaining to the same link or router are processed sequentially, and messages that pertain to bandwidth changes are also processed sequentially, both other messages may be processed at least substantially in parallel, up to a system administrator-specified limit of parallel messages being processed substantially in parallel.

The new process started at step 270 schedules the next query of the router just queried 282, at the end of the query period for that router (the date and time of each query made to a router and the IP address for the router is recorded for use in determining the end of the query period), and subsequent queries will be repeatedly made to that router until the first such end of the query period past the reoptimization timer period for that router added to the time of receipt of the original IGP message, syslog message or trap. The period used to schedule the queries is configurable by a system administrator as described herein.

If there are no more queries scheduled (because the last query past the end of the reoptimization timer period has occurred) 284, the process terminates 286. Otherwise 284, at the next scheduled time, the router is again asked whether there are changes to tunnels transiting the link, the response is received and the date and time, and IP address of the router corresponding to the query is recorded 288. If the response indicates that there have been no changes 290, the next attempt will be scheduled or the process will terminate as described above 282-286. Otherwise 290, the router will be queried to identify the LPSs that changed, the log is consulted to determine if any of those LSPs can be ignored in the same manner described above, and any remaining LSPs are located in the master list to identify the head end router, and if there are any remaining LSPs, as described above, the head end router or routers is requested to identify the path or paths corresponding to such LSPs, the master list is updated using the response or responses received from the head end router or routers, one or more timestamped entries are added to the log of changes to the master list 292, and the next query is scheduled; or the process is terminated if one query past the end of the reoptimization timer period for the router has been made 282-286. The reoptimization timer period for each router may be received as part of step 210 and stored in the master list.

FIG. 3 is a flowchart illustrating a method of updating the information obtained in the performance of the method of FIG. 2 via a lighweight system poll according to one embodiment of the present invention. Referring now to FIG. 3, in one embodiment, more frequently than the full system poll, such as once every fifteen minutes or another period supplied by the system administrator, a lightweight poll is initiated. The method waits until the end of this period 310 either following step 210 or as described below. A first one or more routers is selected from every router, or every router that could be or is the head end router for tunnel traffic or carry tunnel traffic 312. One router will be used for the description, though routers may be queried in parallel up to the system administrator specified limit. At or after the end of the selected router's query period, the router is asked whether any tunnel information has changed since the last time the router was asked this question (for any reason as described above or just as part of the prior lightweight system poll), and the identifier of the router and the date and time is recorded 314. Routers may be asked this question with the routers for which the query period has already expired or will soon be expiring before other routers for which the query period is expiring later, so that no more time than necessary is spent waiting for the end of that router's query period.

If the router responds negatively, if there are more routers that have not been queried as part of the current lightweight query 316, the next router will be selected 318 and the method continues at step 314 for that router. As noted, the routers may be queried in parallel, up to the system administrator supplied limit for all queries being performed in parallel or substantially in parallel.

If the router responds affirmatively, the router is asked for the LSPs that have changed, and the head end router for each such LSP is identified using the master list and requested to provide the path for that LSP or those LSPs for which it is the head end, the master list is updated and a timestamped entry is added to the log of the changes to reflect the changes in the path 314.

A determination is made as to whether a full system query of step 210 is scheduled before the next lightweight system poll 320 and if so 322, the method terminates 324 and otherwise 322, the method continues at step 310.

FIG. 4 is a flowchart illustrating a method of receiving system administrator supplied information according to one embodiment of the present invention. A system administrator may provide one or more query periods, one or more lightweight query periods, the period used to reschedule queries in made in the new processes and the period of delay between the start of lightweight system queries described in FIG. 3 as described above and such information is received and stored, for example, in a computer memory 410. There may be different such periods for different times of day or days of the week, and there may be a different query period for different routers. In one embodiment, the query period may be identified on a per router basis as a function of the percentage of available bandwidth on the average link that is reserved by the tunnels on that link, with routers with a higher average percentage of available bandwidth reserved having a longer query period than routers with a lower average percentage of available bandwidth reserved, or another function.

FIG. 5 is a flowchart illustrating a method of changing a configuration of a network using the master list and/or log. A problem or issue with a tunnel is identified and the master list is displayed and based on the master list, the network may be reconfigured or repaired 510. The method repeats at step 510 as desired.

In one embodiment, updates to the master list do not overwrite the information in the master list: instead, a new entry is timestamped with the date and time of receipt of the message (which is timestamped and stored as it is received) that gave rise to the entry and the information is added to the master list. The contents of the master list may be displayed as of a certain date and time to reconfigure the network or identify other problems.

Figure 6A:
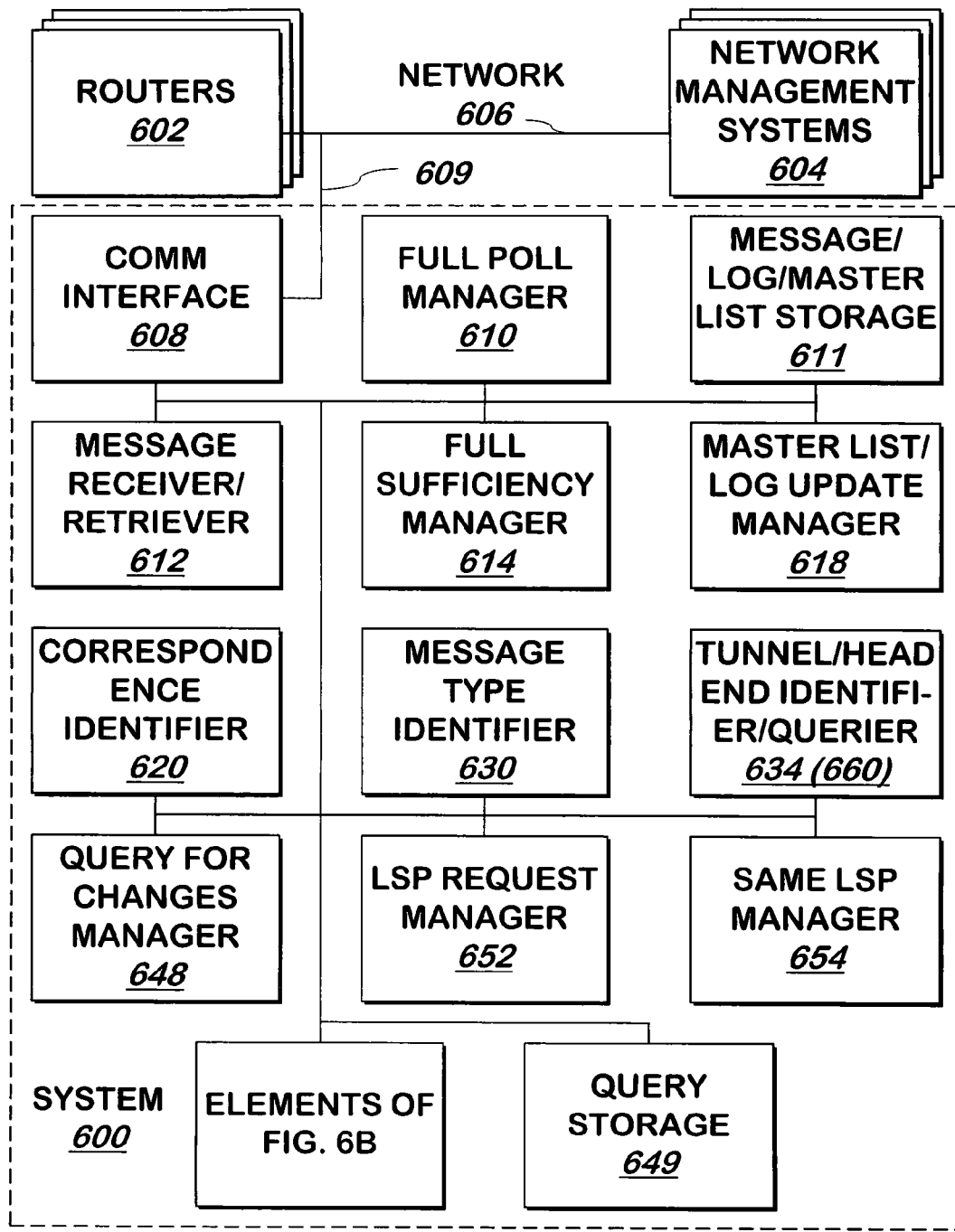
FIG. 6, consisting of FIGS. 6A and 6B, is a block schematic diagram of a system for requesting and receiving tunnel information according to one embodiment of the present invention.
Figure 6B:
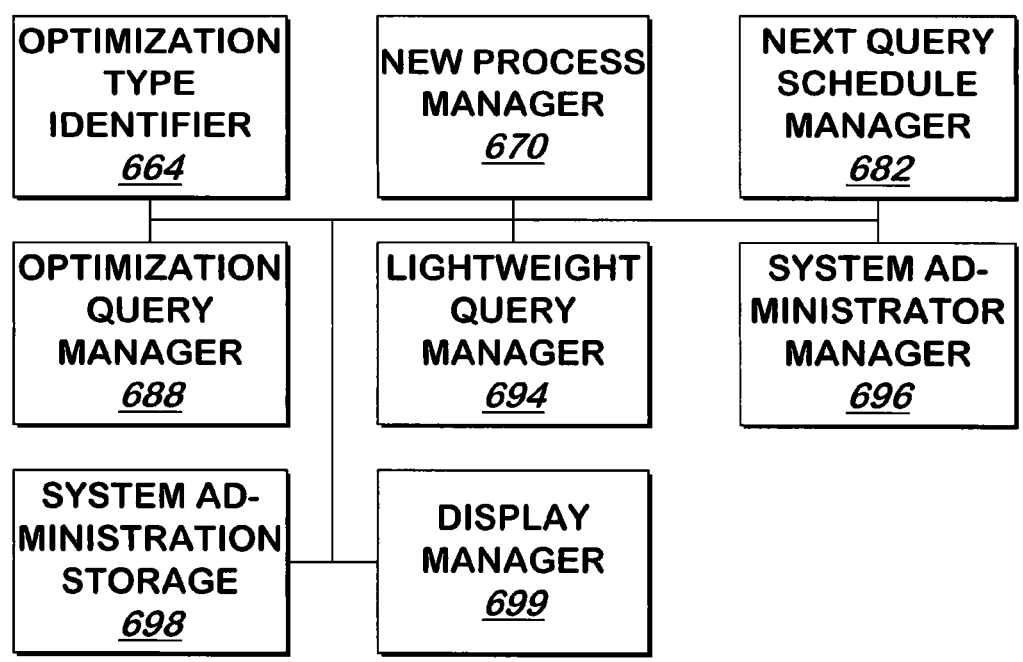

FIG. 6, consisting of FIGS. 6A and 6B is a block schematic diagram of a system for troubleshooting and changing a network.

Referring now to FIG. 6, routers 602 are conventional routers providing messages and responses as described above. Network management systems 604 are conventional network management systems that receive messages and traps from routers 602. System 600 may be a conventional computer system that operates as described herein. Each is connected to one another by a network 606, which may include a conventional Ethernet network, the Internet or both.

Communication interface 608 includes a conventional TCP/IP-compatible communication interface running suitable communication protocols. All communication with system 600 is made via communication interface 608. Message/log/master list storage 611 and system administration storage 698 include conventional computer memory or disk storage and may include a conventional database. Messages and traps, the master list and the log are stored in message/log/master list storage 611. A system administrator uses a conventional computer system (not shown) to communication with system administrator manager 696 which receives the various parameters described above such as periods or maximum number of parallel queries and stores them into system administration storage 698. Display manager 696 displays the log and master list for use in configuring or changing the routers 602 or diagnosing problems in the network.

Elements 610, 612-688 perform the functions described in the steps of FIG. 2 that share the same last two digits: that is, full poll manager 610 performs the function of step 210. Tunnel/head end identifier/querier 634 may perform the functions of steps 234 and 260. If a step in FIG. 2 does not have a corresponding element in FIG. 6, its function is performed by the element having the nearest last two digits that precede the last two digits in that step. Thus, full sufficiency manager 614 performs step 216 as well as step 214, and tunnel/head end identifier/querier 634 performs steps 260 and 262 in addition to steps 234.

In one embodiment, when a message is processed as described herein, the message is selected by full sufficiency manager 614 from message/log/master list storage 611 where it is timestamped and stored by message receiver/retriever 612, and a message object is created by full sufficiency manager 614 containing a link to the stored message. Each element 610, 612-688 passes the message object to the next element after processing it as described herein, and storing any response from the router or a summary of such response, into the message object. For example, the LSPs received from a router may be stored into the message object. To ignore an LSP, the LSP may be marked as one to be ignored in the message object. Element 288 may use the other elements, such as LSP request manager 652 and same LSP manager 654 to perform the functions described. When processing is finished for a message object, for example, after performing step 218, the message object is destroyed or may be stored into message/log/master list storage 611 associated with the message to which it corresponds, and would not be passed to another element.

Lightweight query manager 694 performs the steps of FIG. 3, building a message object that references no message, but indicates a router, and provides the message object to query for changes manager 648, which processes it and passes it as described above. If the message object references no message, tunnel/head end identifier/querier 634 will not provide the message object to optimization type identifier 664.

New process manager 670 will provide the message object to next query schedule manager 682, but will mark it as an optimization requery object. Tunnel/head end identifier/querier 634 will not provide the message object to optimization type identifier 664 if it is so marked.

In one embodiment, the identifier of the router and the date and time of any query made to that router is stored into query storage 649 and the elements that perform the queries made to routers (except LSP request manager 652 in the embodiment in which such requests do not use the query period as described above) use such information and the information in system administration storage 698 to ensure that routers are not queried more frequently than desired as described above.

What is claimed is:

1. A method of requesting tunnel path information from a plurality of routers, comprising:
   receiving a plurality of Interior Gateway Protocol messages that each correspond to at least one of the plurality of routers; and
   for each of the plurality of Interior Gateway Protocol messages received:
      determining that the Interior Gateway Protocol message is not fully sufficient to obtain all pertinent tunnel path information;
      determining that the Interior Gateway Protocol message does not correspond to a recent entry on a log or a master list by determining that the router corresponding to the Interior Gateway Protocol message needs to be queried by determining that the Interior Gateway Protocol message is not an Interior Gateway Protocol message indicating that the link is down;
      determining that the Interior Gateway Protocol message is fully sufficient to obtain all pertinent tunnel path information;
      identifying whether the Interior Gateway Protocol message could potentially indicate tunnel path information has been altered; and
      responsive to the Interior Gateway Protocol message being identified as one potentially indicating that tunnel path information has been altered:
         identifying a router of the plurality of routers for which tunnel path information has been changed;
         querying the router identified to indicate whether tunnel path information has changed since the last time the router was queried; and
         responsive to the router indicating tunnel path information has changed since the last time the router was queried:
            requesting the router to identify at least one tunnel that has changed and receiving a response identifying said at least one tunnel;
            identifying at least one head end router corresponding to each tunnel identified in the response; and
            requesting from the at least one head end router the tunnel path information about at least one of the at least one tunnel identified.

2. The method of claim 1 wherein the tunnel path information further comprises:
   tunnel is down.

3. The method of claim 1 wherein method further comprises after determining that the Interior Gateway Protocol message is not fully sufficient to obtain all pertinent tunnel path information and before determining that the Interior Gateway Protocol message is fully sufficient to obtain all pertinent tunnel path information:
   determining that the Interior Gateway Protocol message corresponds to a recent entry on a log or a master list.

4. The method of claim 3 wherein determining that the Interior Gateway Protocol message corresponds to the recent entry on the log or the master list further comprises:
   determining that the Interior Gateway Protocol message corresponds to a bandwidth reservation change Interior Gateway Protocol message.

5. The method of claim 1 wherein determining that the Interior Gateway Protocol message does not correspond to the recent entry on the log or the master list further comprises:
   determining that the router corresponding to the Interior Gateway Protocol message does not need to be queried.

6. The method of claim 5 wherein determining that the router corresponding to the Interior Gateway Protocol message does not need to be queried further comprises:
   determining that the Interior Gateway Protocol message is a link down Interior Gateway Protocol message.

7. A method of requesting tunnel path information from a plurality of routers, the method comprising:
   determining that the Interior Gateway Protocol message is not fully sufficient to obtain all pertinent tunnel path information;
   determining that the Interior Gateway Protocol message does not correspond to a recent entry on a log or a master list by determining that the router corresponding to the Interior Gateway Protocol message needs to be queried by determining that the Interior Gateway Protocol message is not an Interior Gateway Protocol message indicating that the link is down;
   identifying that an Interior Gateway Protocol message could potentially indicate that tunnel path information has been altered;
   identifying a router for which tunnel path information has been changed;
   requesting the router to identify at least one tunnel that has changed;
   receiving a response identifying said at least one tunnel;
   identifying at least one head end router corresponding to each tunnel identified in the response; and
   requesting from the at least one head end router the tunnel path information about at least one of the at least one tunnel identified.

8. The method of claim 7 wherein the method further comprises after identifying the router for which tunnel path information has been changed:
   determining that tunnel path information has changed since the last time the router was queried.

9. The method of claim 7 wherein method further comprises after requesting the router to identify at least one tunnel that has changed:
   determining that the Interior Gateway Protocol message is not fully sufficient to obtain all pertinent tunnel path information,
   receiving a response identifying said at least tunnel.

10. The method of claim 9 wherein method further comprises after determining that the Interior Gateway Protocol message is not fully sufficient to obtain all pertinent tunnel path information:
   determining that the Interior Gateway Protocol message corresponds to a recent entry on a log or a master list.

11. A method of requesting tunnel path information from a plurality of routers, the method comprising:
   determining that the Interior Gateway Protocol message is not fully sufficient to obtain all pertinent tunnel path information;

determining that the Interior Gateway Protocol message does not correspond to a recent entry on a log or a master list by determining that the router corresponding to the Interior Gateway Protocol message needs to be queried by determining that the Interior Gateway Protocol message is not an Interior Gateway Protocol message indicating that the link is down;

identifying that the Interior Gateway Protocol message could potentially indicate that tunnel path information has been altered;

identifying a router for which tunnel path information has been changed;

determining that tunnel path information has changed since the last time the router was queried;

requesting the router to identify at least one tunnel that has changed and receiving a response identifying said at least one tunnel;

identifying at least one head end router corresponding to each tunnel identified in the response; and requesting from the at least one head end router the tunnel path information about at least one of the at least one tunnel identified.

12. The method of claim 11 wherein method further comprises after determining that the Interior Gateway Protocol message is not fully sufficient to obtain all pertinent tunnel path information:

determining that the Interior Gateway Protocol message corresponds to a recent entry on a log or a master list.

* * * * *